United States Patent [19]

Roach et al.

[11] 4,133,019

[45] Jan. 2, 1979

[54] AIR GAP BACK-UP SURGE ARRESTER

[75] Inventors: Alfred J. Roach, Lindenhurst; Charles Roberts, Rosedale, both of N.Y.

[73] Assignee: TII Corporation, Lindenhurst, N.Y.

[21] Appl. No.: 741,247

[22] Filed: Nov. 12, 1976

[51] Int. Cl.[2] .................... H02H 3/22

[52] U.S. Cl. .................... 361/124; 361/129; 337/32; 337/34

[58] Field of Search .................... 361/124, 125, 129, 120, 361/117, 118, 119; 337/32, 33, 34, 28, 29; 315/36

[56] References Cited

U.S. PATENT DOCUMENTS

| | | | |
|---|---|---|---|
| 617,170 | 1/1899 | Lawton et al. | 361/124 |
| 897,590 | 9/1908 | Cook | 337/29 |
| 3,281,625 | 10/1966 | Wanaselja | 361/124 X |
| 3,340,431 | 9/1967 | Wanaselja | 361/124 |
| 3,411,040 | 11/1968 | Dietz | 361/119 |
| 4,062,054 | 12/1977 | Simokat | 361/124 |

*Primary Examiner*—Patrick R. Salce
*Attorney, Agent, or Firm*—Morgan, Finnegan, Pine, Foley & Lee

[57] ABSTRACT

Disclosed herein is a three-element gas tube fail-safe station protector of known design modified to incorporate a back-up air gap system. To the ground terminal stud of the protector is added a lateral conductive member defining a pair of blade-shaped ground electrodes. To each of the line electrode terminal studs is added a conductive blade-shaped electrode which overlaps and is spaced from a respective one of the ground electrodes. The air gaps which are thus defined between ground and each line, i.e. paralleling the gas tube gaps, are encapsulated and dimensioned to provide back-up ionization in the event of a failure of the gas tube.

3 Claims, 8 Drawing Figures

AIR GAP BACK-UP SURGE ARRESTER

BACKGROUND

A type of surge arrester which incorporates a failsafe shorting and grounding mechanism to deal with sustained overloads is described in U.S. Pat. No. 3,340,431. The assignee of that patent and of the instant application, TII Corporation, markets an embodiment of the patent as the widely used 300 Series Station Protector.

In recent years there has been a growing movement to provide even greater security against equipment damage and to that end, known gas tube station protectors have been connected in parallel with air gap protectors, e.g. of the carbon block type, or have been modified to include back-up air gaps; in the event the gas tube fails, the air gaps provide interim protection.

The known arrangements for achieving these features are burdened by one or more disadvantages involving relatively expensive components or expensive assembly procedures, or noise prone gap structures, or lack of integral design leaving the unit vulnerable to inadvertent omission of the back-up unit.

OBJECTS

It is accordingly an object of the invention to provide a surge arrester system combining the advantages of gas tube protection and fail-safe shorting, with a back-up air gap arrangement which is integral, highly stable, efficient and inexpensive.

SUMMARY OF THE INVENTION

Other objects and advantages of the invention will be realized in the study and practice of the invention which may be summarized as follows:

In a gas tube protector assembly having (1) a housing base, (2) resilient clips therein for receiving the gas tube, (3) terminal conductors therein for interconnecting the gas tube electrodes with the protected circuit, (4) a fusible element located to sense excessive heat in the gas tube and (5) a shorting and grounding assembly arranged to respond to fusing of the fusible element to short circuit and ground the gas tube, the improvement comprising conductor elements in said base connected to each of said terminal conductors and disposed in overlapping relation to define an air gap configuration, and means for enclosing said air gap configuration.

DRAWINGS

Illustrating various embodiments of the invention are the drawings of which:

FIGS. 5*a*, 5*b*, 5*c* and 5*d* are fragmentary, detailed, and enlarged views illustrating respectively, alternative forms of air gap electrode structures.

DESCRIPTION OF THE PREFERRED EMBODIMENT

The following discussion first provides a description of the basic station arrester as described in U.S. Pat. No. 3,340,431. This is followed by a description of the air gap back-up arrangements.

Basic Station Arrester (see also TII Series 300)

Figure 1:
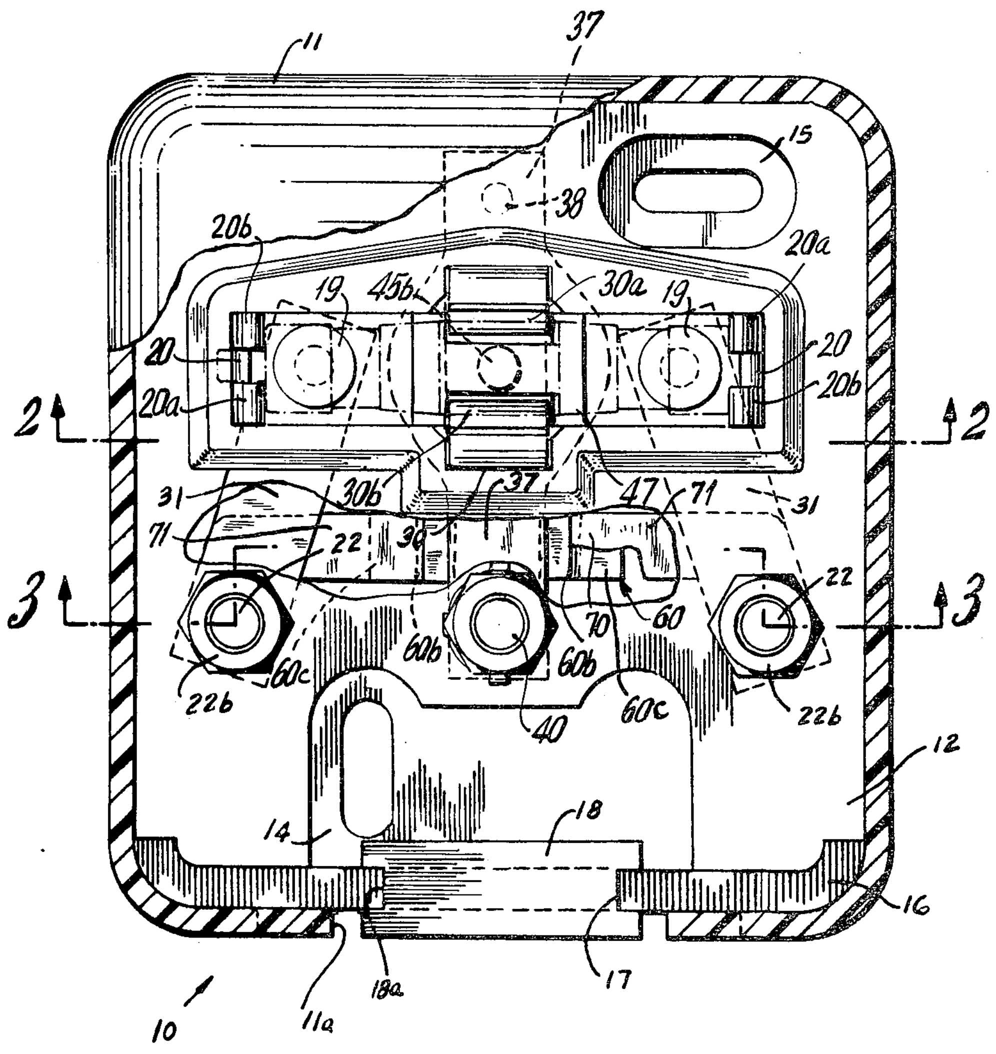
FIG. 1 is a plan view of a first embodiment.
Figure 2:
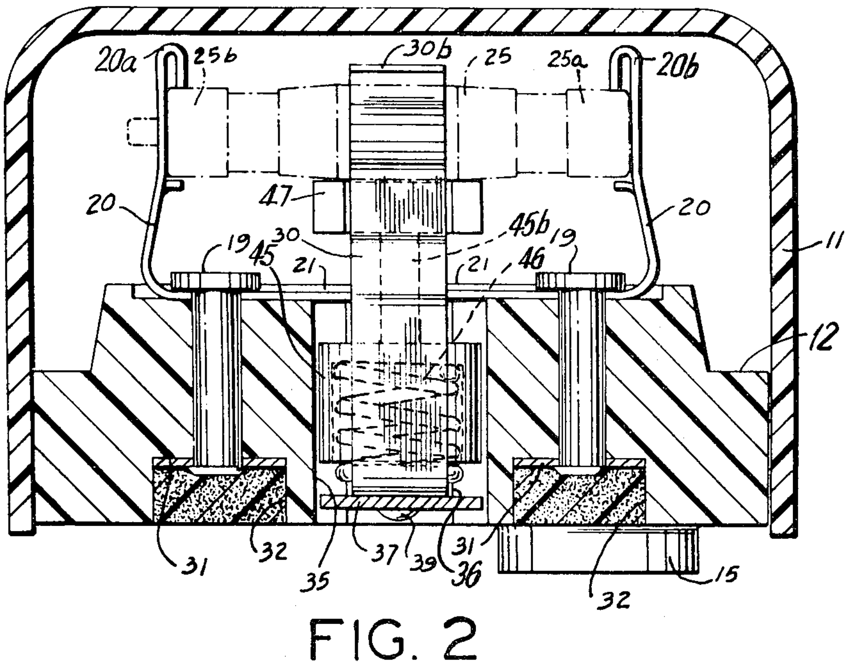
FIG. 2 is an elevational, cross-sectional view taken along the lines 2—2 of FIG. 1.

The illustrated first embodiment comprises a housing assembly 10 which includes a cover 11 and a base 12. (See FIGS. 1, 2, 3.) The housing assembly is illustratively constructed of Bakelite, is adapted for sealing, and base 12 thereof includes mounting pads 14 and 15 (FIGS. 1, 2).

Base 12 is provided with a flanged portion 16 (FIG. 1) which includes a cut-out portion 17 (FIG. 1) for receiving a grommet 18 through which the ground and signal or power lines are routed. The grommet is slotted as at **18*a* to overlap flange wall 17. The cover 11 includes a cut-out portion 11*a*** for accommodating the grommet and the top portion thereof bears against the grommet.

Mounted on the base is aligned relationship and secured by suitable means such as rivets 19, are a pair of clips 20 (FIGS. 1, 2) each bifurcated to form spaced tines **20*a* and 20*b*. Each clip 20 also includes an integral inwardly directed extension 21**, the distal region of which serves a purpose hereinafter described.

Associated with each clip 20 and connected thereto by means of the respective rivet 19 is a jumper strap 31 (FIGS. 1, 2) located in a resin-packed recess 32 in the underside of the base. The strap and recess associated with each clip are routed obliquely to the region **32*a*, FIG. 3. The base is bored in each of these regions to facilitate installation of the flat-headed threaded stud 22 serving as a wire terminal for the respective clip 20. Each stud passes through a hole in its respective strap and up through the base to present a threaded terminal on which a staked mounting nut 22*a* and wire clamping nut 22*b*** with washers are threaded.

It may be seen that the above arrangement provides an electrical connection from each terminal 22 to its respective clip 20.

The clips 20 are aligned and biased inwardly to receive and resiliently clamp the overvoltage element 25. In the illustrated embodiment, this overvoltage element is of known construction, being for example, a TII type 16 gas tube protector having a pair of opposed, spaced electrodes (not shown), each of which makes electrical contact with the respective cartridge end contacts **25*a* and 25*b*. By way of clips 20, jumpers 31 and wire terminals 22, the electrodes are each connected to one of the lines to be protected. In the presence of an excessive voltage across the lines, the gas between the electrodes is ionized thereby effectively shorting the end terminals 25A, 25B and connecting them to the case of the protector and to external ground as described below. The lines and equipment connected to these electrodes via the clips 20** are thus also short-circuited to thereby prevent the overvoltage condition from causing excessive current flow in the protected apparatus.

Resiliently clamping the center metallic sleeve on gas tube cartridge 25 and making electrical contact therewith is a clip 30 of generally U-shaped configuration having a pair of blades **30*a* and 30*b* formed in the upper sections of the legs of the U. These upper sections are offset inwardly with respect to the lower leg extremities and the blades 30*a* and 30*b* are biased inwardly and include grooved sections for engaging and resiliently clamping the body of the overvoltage protector 25**.

The lower portion of clip 30 is seated in a recess 35 in base 10, see FIG. 2. One end of a jumper 37 (FIGS. 1–4) is disposed in the recess and is secured to the base by means such as drive screw 38, (FIGS. 1–4). At an intermediate portion of jumper 37 there is provided a rivet 39 which connects the jumper to clip 30 and to a spring rest 36 as shown in FIG. 2. See also FIG. 4.

The other end of jumper 37 receives a threaded ground terminal 40 having a shank in engagement with the jumper and a shaft which extends up through the base to a point adjacent the cover 11. At this point, the cover 11 is recessed and bored permitting a cover nut 41 to be inserted through the cover into engagement with the threaded ground stud. A staked nut 42 on shaft 40 serves to complete the securing of the terminal to the base, while an additional nut 43 and associated washers are provided for clamping the ground wire to terminal 40. When this is done, a ground connection is supplied to clip 30 and thence to the body of protector 25 by way of terminal 40 and jumper 37.

It may be seen from the above that the presence of an overvoltage condition sufficient to ionize discharge device 25 produces a low resistance path from the lines connected to terminals 22 to ground by way of the above-described connections.

In the case of a prolonged or excessive overvoltage condition, there is a possibility that gas tube 25 will fail thereby subjecting the equipment to be protected to serious damage. To eliminate this possibility and to provide additional reliability and safety, supplementary shorting and grounding means are provided as described below.

Disposed between the legs of clip 30 is a shorting member 45 which consists of a lower cylindrical portion slightly less in diameter than the spacing between the legs of clip 30, and an integral upper cylindrical section **45*b* of reduced diameter. Between the clip legs in a recess in 45, is a spring 46 which has one end bearing against spring rest 36 and the upper end located at the top of the recess in the shorting member 45 and bearing upwardly against same to urge the shorting member in an upward direction. Interposed between the distal end of the shorting member 45 and the body of protector 25 is a fusible element 47 shaped generally in the form of an H with the cross-leg located between the legs of clip 30. Fusible member 47 is constrained to this general position by virtue of the outward flaring of the legs of clip 30 immediately above and below the fusible element. It may be seen that spring 46 urges shorting ram 45 into engagement with fusible element 47 and the latter is thereby urged into thermally conductive pressure engagement with the body of protector 25**.

Fusible element 47 is composed of a suitable alloy for melting under predetermined overvoltage conditions while maintaining its shape during normal conditions notwithstanding the pressure generated resulting from spring 46.

It may be noted that the above-described shorting arrangement is electrically at ground potential by virtue of its connection with grounding jumper 37 and ground terminal 40. To insure a continuous acting and effective ground, a U-shaped wiper (not shown) is included in the assembly; its base is clamped between spring rest 36 and the base of spring 30 while its legs are resiliently pressed between the outer wall of shorting member 45 and the inner wall of the legs of clip 30.

In the position shown, the above assembly is electrically insulated from the end clips 20 which connect to the lines to be protected and to the electrodes of the overvoltage discharge tube 25. This may be seen, for example, by reference to FIG. 2, it being apparent that the shorting member 45 does not make contact with the sections 21 of the end clips in the position shown.

However, in the case of a sustained or excessive overvoltage condition which heats the overvoltage tube 25, the composition and disposition of fusible element 47 is such as to cause that element to fuse. In this event, spring 46 forces the shorting member 45 upwardly towards engagement with protector 25. This upward movement causes the enlarged cylindrical section of shorting member 45 to contact the resilient distal ends 21 (FIG. 2) of spring clips 20, thus shorting these two clips and connecting them to ground potential. Hence, in the event of an overvoltage condition of such dimensions that discharge device 25 does not provide the required protection, the above-described supplementary shorting and grounding assembly shorts the protected lines to ground thereby protecting the terminal equipment.

It should be noted that the overhanging ends of the clips 20 are in a resilient configuration which insures positive and continued contact of these ends of the clips and the shorting ram 45 when supplementary shorting and grounding occur.

Back-Up Air Gap

Turning now to the back-up air gap arrangement, attention is directed to the conductor members for interconnecting the threaded line terminal studs 22 with the end clips 20, and the ground stud 40 with center clip 30.

Taking for example the connecting strap between ground stud 40 and center clip 30, it may be noted that there is also provided in base 12 a ground electrode structure 60 preferably of copper in the form of a clip having a center section 60A in electrical contact and squeezed between the head 40A of ground stud 40 and ground jumper 37. Extending laterally in opposite directions from the bridge section 60A are extensions 60B each of which includes a blade-shaped terminal section 60C forming an air gap pole face.

Each of the pole faces 60C is in overlapping and spaced relationship with a similarly configured pole face 70 which constitutes the distal end of a conductor 71, the opposite end of which is in electrical contact with and gripped between the respective head 75 of line terminal stud 22 and the associated jumper 31.

Figure 3:
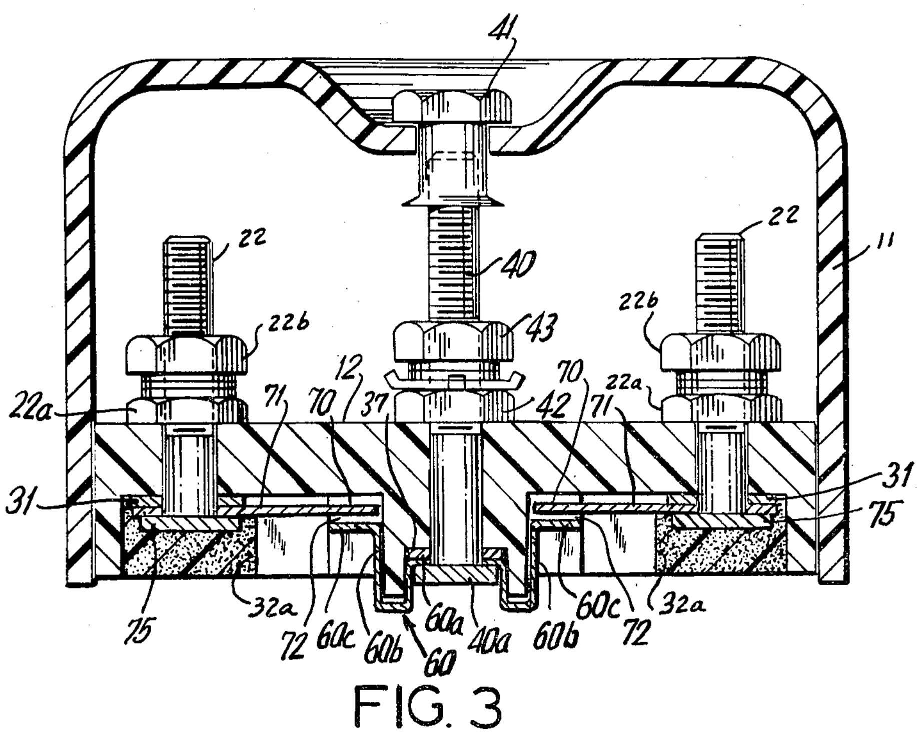
FIG. 3 is an elevational, cross-sectional view taken along the lines 3—3 of FIG. 1.
Figure 4:
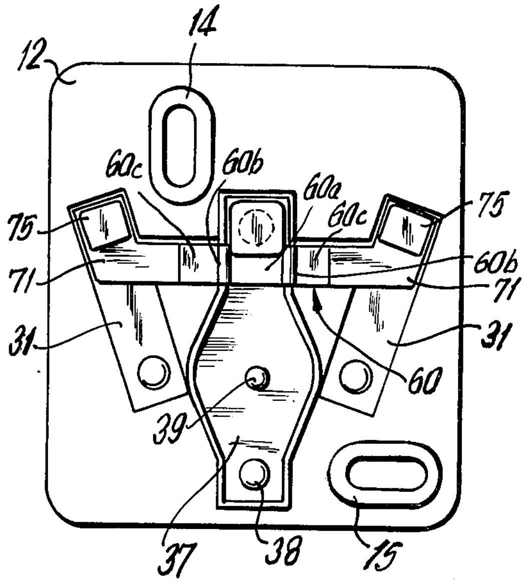
FIG. 4 is a plan view on reduced scale of the base of the embodiment of FIGS. 1–3.

The profile shape for the foregoing pole gap elements may be seen in FIG. 3 and the plan configuration in FIGS. 1 and 4. Alternatively, the members 60 and 71 may be integral elements or sections of the respective straps or jumpers.

The air gaps 72 defined by the pole faces 60C and 70 are molded into base 12, being protected, e.g. by masking or wrapping with teflon tape, or by use of shrink tubing, or by design of the mold, so that the plastic base material does not enter the air gap regions in the course of the molding process.

Figure 5A:
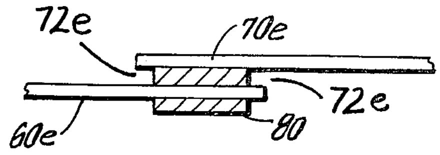
Figure 5B:
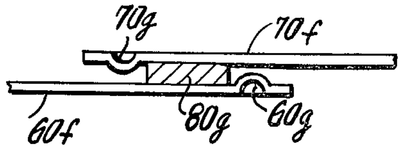
Figure 5C:
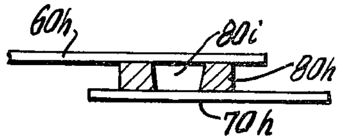
Figure 5D:
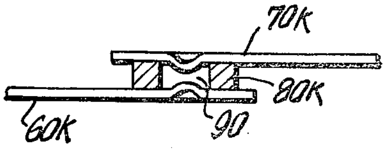

To preserve gap spacing the stiffness of the pole pieces 60C, 70 may be relied on or as illustrated in FIGS. 5*a*, 5*d*, spacers under moderate compression from the pole pieces may be used.

In the arrangement of FIG. 5*a*, a sleeve 80 on each pole piece **60*e* is employed with regions 72*e*** between the pole pieces serving as the active gaps.

In the embodiment of FIG. 5*b*, each ground electrode pole **60*f* includes a dimpled section 60*g* for defining one gap between the high point on 60*g* and the opposite section of the line electrode pole 70*f***.

Similarly, each electrode 70*f* includes a dimpled portion 70*g* which together with the opposing section of ground pole 60*f* defines a second air gap.

A spacer, e.g. a disc, strip or wafer, 80*g* is fitted between the two electrodes in the region between the two gaps 60*g*/70*f* and 70*g*/60*f*.

In the embodiment of FIG. 5*c*, each ground pole 60*h* is placed above the respective line electrode pole 70*h* and an annular spacer 80*h* is inserted therebetween such that the hollow space 80*i* circumscribes the operative gap.

In the embodiment of FIG. 5*d*, each ground electrode 60*k* and its contiguous line electrode 70*k* are provided with dimpled portions to define an air gap region 90 which is also surrounded by an annular shaped spacer, apertured disc or the like, designated 80*k*.

What is claimed is:

1. In a gas tube protector assembly for a protected circuit, said assembly being adapted to contain a gas tube having three electrodes and wherein said assembly includes (1) a housing base, (2) resilient clips therein for receiving the gas tube, (3) terminal conductors therein for interconnecting said gas tube electrodes with said protected circuit said terminal conductors including a common conductor and a pair of line conductors disposed on opposite sides of said common conductor, (4) a fusible element located to sense excessive heat in said gas tube, and (5) a shorting and grounding assembly arranged to respond to fusing of the fusible element to short circuit and ground the gas tube, the improvement comprising a plurality of gap forming conductor elements in said base including-common pole face forming means conncted to said common conductor, extending laterally therefrom towards said line conductors and terminating with a blade-shaped section in overlapping and spaced relationship with a similarly configured pole face of said line conductors, thereby defining a pair of air gaps, and means for enclosing said air gap configuration.

2. The protector assembly as defined in claim 1 wherein said enclosing means comprise a void in said base.

3. The protector assembly as defined in claim 1 including spacing means between the overlapping portions of said gap forming conductor elements.

* * * * *